(12) United States Patent
Bettinger et al.

(10) Patent No.: US 8,584,819 B2
(45) Date of Patent: Nov. 19, 2013

(54) RE-STABILIZED IMPACT STRUT

(76) Inventors: David S. Bettinger, Grosse Ile, MI (US); Thomas J. Whitney, Kettering, OH (US)

( * ) Notice: Subject to any disclaimer, the term of this patent is extended or adjusted under 35 U.S.C. 154(b) by 284 days.

(21) Appl. No.: 13/021,058

(22) Filed: Feb. 4, 2011

(65) Prior Publication Data

US 2012/0200115 A1    Aug. 9, 2012

(51) Int. Cl.
*F16F 7/12* (2006.01)
(52) U.S. Cl.
USPC ............................................. 188/372
(58) Field of Classification Search
USPC ................................. 188/371–379
See application file for complete search history.

(56) References Cited

U.S. PATENT DOCUMENTS

| | | | | |
|---|---|---|---|---|
| 3,236,333 A | * | 2/1966 | Mitchell | 188/374 |
| 3,666,055 A | * | 5/1972 | Walker et al. | 188/376 |
| 4,336,868 A | * | 6/1982 | Wilson et al. | 188/376 |
| 4,995,486 A | * | 2/1991 | Garneweidner | 188/374 |
| 5,351,791 A | * | 10/1994 | Rosenzweig | 188/372 |
| 6,135,252 A | * | 10/2000 | Knotts | 188/374 |

* cited by examiner

Primary Examiner — Christopher Schwartz

(57) ABSTRACT

Low-velocity axial impact thrust on a bonded telescoping middle joint of a strut is retarded and impact energy is converted and absorbed by the elastic strain of unfettered circumferentially bands. In a preferred embodiment an impacted strut regains structural integrity after impact displacement and fracture by re-bonding.

20 Claims, 2 Drawing Sheets

RE-STABILIZED IMPACT STRUT

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

The invention is related to structural bonded joints that are frangible due to impact momentum that is moderated during displacement by elastic tension means and further related to structural members able to survive impact by energy absorption despite displacement to new secure telescoping structural bonded surfaces and are thus restabilized. And further related to structures of polymer matrix composites impacted by low-velocity, non-ballistic impacts communicated by structural, hydraulic or pneumatic means.

The invention is also directed to pipe sections constructed and their structural connections, and more particularly to couplings between bonded telescoping members providing static support where an impacted member thrusts a conical taper, flare, or bulge into a more static member to sequentially stretch a multitude of circumferential wound bands, fiber tows, hybrid tow, wire, braid, or polymer-impregnated high-modulus fiber strips to retard the momentum of the impacted member whereby structural stability is maintained after impact. They represent a class of devices that support structural load, yield to impact, and regain structural support and re-stabilization.

In the structural field, impacts on columns, frames, and trusses are generated by moving vehicles at velocities under 70 mph. A vehicle running over a brick lying on a bridge deck sends a jolt into the entire supporting truss structure. If the structure is constructed of composites it may only weigh a fraction of the equivalent weight of a reinforced concrete structure. This smaller mass drastically increases impact vulnerability. Composites members are also weaker in compression than tension.

Aerospace structures may experience low-velocity impact. Space station trusses are at risk during docking. Landers risk engine failure, or an unsuitable site. In space, structural deformity is acceptable if collapse is prevented.

Hydraulic or pneumatic shock absorbers are common, but not for long-term structural loads since their seals would fail. A device is needed to absorb applied fluidic impact by structural means exterior of reservoir integrity.

In the prior art it is common to find impact absorption that occurs orthogonal to the direction by bending. An automobile leaf spring is an example.

In the prior art it is common to find single-impact-use absorbers. Bumpers, crumple zones, and steering columns of an automobile are examples. Damage to these components is justified to prevent or moderate human injury.

In the prior art of fiber energy absorption, deformation and breakage predominates because ballistic damage has been a focus. For high-velocity impacts the affected fiber length is short being measured in multiples of fiber diameter. Low-velocity impacts have time to access a more substantial fiber length. The available length of a continuous fiber wound around a 7.6 inch pipe would be 24 inches. This 24 inch fiber would have about 1000 times the low-velocity energy absorption capacity compared to simple fiber breakage.

BRIEF SUMMARY OF THE INVENTION

In order to overcome the short-comings of the prior art the current invention is briefly stated a bonded pipe joint mid of a compressive strut, the bonded joint being broken by low-velocity axial impact on a male active member, absorbing momentum by sequential progressive sacrificial orthogonal strain on the unhindered warp of bands of a female member, and reasserting structural bond between new telescoped surfaces.

For the current invention there are two members of a strut connected by a joint. The male member is the impact communicator, the active transmitter, conveyor of momentum to break the joint and the splitter, expander and accessor of the elasticity of the female member. The female member is the passive receiver, the yielder, responder, and translator that converts the received momentum to dissipated elastic energy.

Typically a framework, end connection, or other component of a structural system channels and communicates impact axially to an integrated compressive component. Within the current invention impact is directed axially by the structural system to a leader portion of the active shaft within the passive member.

The current invention teaches that the goal of structural impact absorption devices and methods should be to accept localized damage if a residual of structural integrity can be recaptured after the impact damage. This goal dictates that the structure must retard the impact momentum, absorb the impact energy, and stretch the impact impulse time duration to the limits of the structure. These three attributes all require substantial elastic response. But structures are designed for unyielding static stiffness. That stiffness counters the essential impact goals. This current invention teaches that only elastic strain energy applied over an extended distance of structural displacement and translation can provide structural impact survival and that only long continuous elastic fibers or bands can provide this elastic strain characteristic. The current invention teaches that the total length of the bands or windings around the absorber member times the ultimate strain of the winding provide a reasonable approximation of the total strain energy that is capable of being absorbed. Complete energy dissipation of the strut of the current invention is provided after impact when the active shaft impactor protrusion has fractured all the surface support of the passive member for rebond.

This current invention teaches that the use of the full elastic range in tension up to and including fiber breakage should be utilized for impact energy absorption. Thus structural scale is a prerequisite to access the full measure of elastic energy absorption. A five foot shock cord will obviously stretch to absorb five times the elastic energy of a one foot piece.

This current invention teaches that breakage of a band length short of a circumference length will proportionally reduce the energy absorption and the impact momentum retarded. The method for addressing and accessing elastic absorption of a circumferential wound fiber on a pipe must assure the unhindered, independence movement for at least a major portion of the pipe circumference. Thus, this current invention teaches impact absorption by Unhindered Continuous Circumferential Wound Banding (UCCWB). This is a unique concept to PMCs because composites have always been considered to act together as a continuous unit to enable stress flow, and distribute stress. Unhindered refers to unbonded, un-fettered, free movement of a band, fiber, or composite strand independent of supporting structure. Naturally some friction with a supporting structure is unavoidable. Continuous refers to a length of winding that experiences multiple wraps around a pipe.

This current invention teaches that the impact member or expander addresses and attacks each ICCWB in sequence stretching these fibers to a predetermined strain by conical wedge action which may or may not be above their breaking point. This current invention teaches that the UCCWB may be fixed at some point for each wrap to assure that one band breakage doesn't unravel subsequent windings. For composites a continuous independent circumferential fiber winding may be fixed at one circumferential point on the wrap to prevent unwinding by previous fiber stretch and breakage.

For the purposes of this current invention, the term band refers to one wrap of the generally continuous circumferential winding that is the principal energy absorber and includes strands, fibers, twisted fibers, fiber tow, spun fibers, coated fiber bundles, nano-impregnated strands, twisted strands, wires, and cured prepreg. Prepreg refers to previously resin impregnated fiber tow.

A feature of the current invention is the sequential addressing of fiber bands until impact momentum is slowed and stopped to the limit of the strut capability, thereby translational damage is balanced and shorting of the strut is limited. The effect is that displacement of the semi-collapsed telescoping strut is limited to the amount of retardance necessary to absorb all of the impact energy by elastic strain. The result is that those at risk from catastrophic systemic failure due to a single component will be provided options for egress.

Another feature of the current invention is the three-stage transformation from first, a static structural element, to second, a dynamic impact absorber, and then third, restabilized as a static structural element.

Another feature of the current invention is to provide impact provision as a stand-alone column, leg, support, or strut, or as a component of a structural framework, truss, or space frame, or as a absorber of hydraulic or pneumatic impulse.

It is a feature of the current invention to provide impact remediation for a structural compressive element for low-velocity impacts of less than 100 feet per second which is roughly equivalent to 70 mph.

Stresses due to impact loads may be found using energy equations as long as materials operate within their elastic ranges. Elastic equations and elastic material behavior are most predictable for relatively heavy impacting masses moving at low velocities on impact. It is objective of the current invention to locate the joint far enough from the point of structural impact communication that despite some inelastic impact behaviors in the active impactor member the elongation of the bands generally operates within elastic ranges. This objective is an indicator that the active impactor member may be fabricated from metals and other non-composites with higher compressive capacities that insulate the bands from a higher-velocity impact pulse that would cause inelastic behavior material in the bands.

The static loading requirements of a strut are the expected live and dead loads. These loads will apply to the bonded joint located in mid strut. Such bonded composite joints between congruent surfaced are proven connections. It is a feature of the current invention that whether all or only a portion of the bands of the responding member are stretched and/or broken, the joint is re-stabilized by re-bonding of the leader to congruent surfaces of the active member.

PREFERRED EMBODIMENT

In a preferred embodiment of the current invention a bonded contact overlap of an inner and outer member, the inner member possessing an outwardly projecting conical taper adjacent to and external to the contact overlap, whereby a forced compressive axial movement of the inner member in relation to the outer member causes progressive sequential elastic strain of the generally circumferential fiber wound fibers as the axial displacement continues due to the wedge effect of increasing differential diameter of the active member, and whereby stable structural rigidity of the joint results after the forced compressive axial movement due to progressive new contact overlap of an inner and outer member in new congruent self-locking contact areas.

An objective of the application of the current invention is to facilitate the responsive and immediate movement, acceleration, and translation of the active impactor member to directed axial impact. Immediate responsive impactor movement will moderated or prevent buckling, delamination, or shatter in an impacted composite column. This current invention teaches that for impact delivered to the active end of the strut, the impacted stiffness capacity of the impactor must be more than the impacted bond capacity of the strut joint. Such impact stiffness capacity comprises physical considerations of impactor length, weight, buckling, material density, pulse transmissiveness, and radius of gyration.

The current invention teaches the use of bonding in a male to female joint. Commonly such joints use adhesives. For re-bonding of joints polyurethane adhesives in particular are known to re-bond congruent contact surfaces.

Unanticipated impacts happen. The degree of some impacts may be anticipated and a structure using the current invention may be built adequately to survive those anticipated impacts. However, an unanticipated increase in mass or velocity can easily damage a strut and fail a structure despite the proper application of the teaching of this current invention. It will be understood by someone schooled in the art that the current invention in spite of advantages over the prior art has distinct but predictable impact limitations. The overriding consideration in structures is human safety whether crossing a bridge or landing on a planet. An objective of this invention is to accept a degree of damage rather than allow catastrophic structural, hydraulic, or pneumatic failure under low-velocity impact conditions that would otherwise cause injury or death.

DETAILED DESCRIPTION OF THE INVENTION

Figure 1:
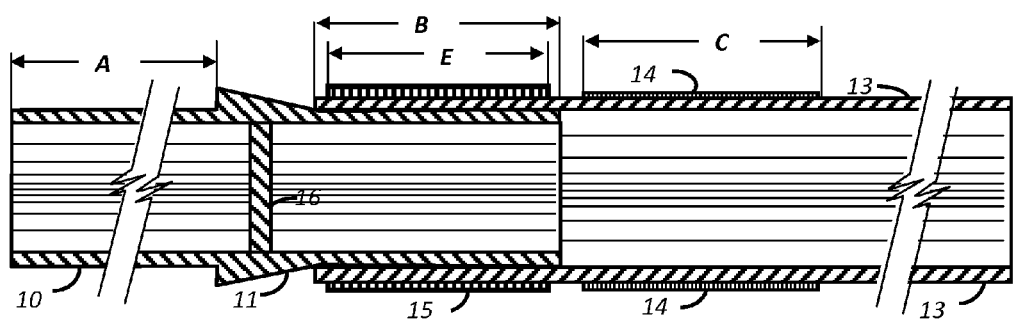
FIG. 1 is a longitudinal cross section through the impact strut after the teaching of this invention.

FIG. 1 shows the two telescoping structural components of the joint. The impactor 10 is a cylindrical shaft. The impactor 10 comprises a shaft length designated as A, a conic bulge 11, and a length of shaft designated as the leader B. The conic bulge 11 is reinforced by a diaphragm 16. This diaphragm 16 is located longitudinally beneath and reinforcing compressive loadings on the conic bulge 11 during male impalement. The absorber comprises a cylindrical shaft having two circumferential windings, the bands 15 and the prestress 14. The energy absorbing bands 15 are generally positioned close to the conic bulge 11 to be active as soon as the bond B is broken under impact. This bond area B designates a structural connection of selectable structural capability between the congruent surfaces 17 of the impactor 10 and absorber 13. The length C indicates a section of prestress windings 14 on the shaft of the absorber 13 to be utilized to rebond the impactor and the absorber after impact.

Figure 2:
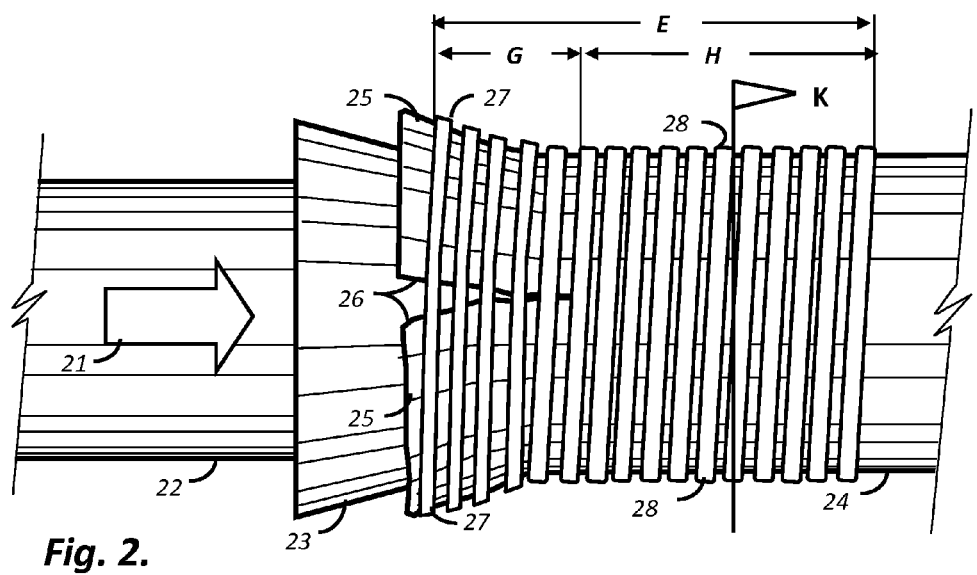
FIG. 2 is a portion after impact of the impactor together with a portion of banded absorber of an impact strut in elevation after the teaching of this invention.

FIG. 2 shows the effect of a intermediate magnitude impact 21 on the structural impact absorbing strut that is sufficient to break the initial structural bond but well within the impact absorbing resilience of the strut. This figure indicates a structural source such as a fixed end or pinned end connection of an external impact by arrow 21 communicated within impactor shaft 22. This impact 21 that has been conveyed and imparted by Impactor shaft 22 to impel conic bulge 23 into absorber shaft 24 which has a continuous circumferential winding indicated by a typical unstressed band 28. The conic bulge 23 of the impactor 22 has been forced in an axial direction into the absorber 24 by impact 21. The impact 21 effect is a split 26 that has separated the absorber 24 at the mouth of the absorber 25. The first of the bands 27 that have been addressed by the deformation and split of the shaft mouth 25 is shown to experience extreme elongation at the limit of its strain capacity. Subsequent bands are proportionally circumferentially elongated by the split 26 of the absorber shaft 24.

It will be understood by one skilled in the art that each winding of band 28 may be adjacent and in close contact and also in layers without hindering the circumferential elongation of the bands 28, since they experience the same rate of change of elongation due to conic surface 23. The desired unfettered condition sought under the teaching of the present invention refers to the relationship between the bands 28 and the surfaces of the female absorber 25.

Figure 3:
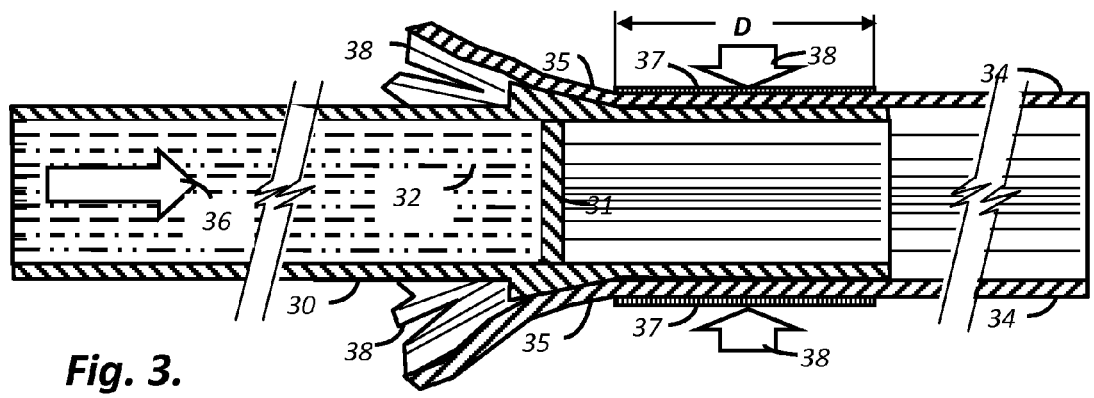
FIG. 3 is a longitudinal section of an impact strut after experiencing impact.

FIG. 3. Shows the result of an external impact 36 conveyed by a resident fluid or gaseous media 32 to an integral diaphragm and compressive support 31. By applying the impact 36 to this diaphragm 31 and thence to the conic protrusion surface 35 the length of the main shaft E of the impactor has been eliminated from the communication of external impact. Therefore structural issues of off-axis loadings, slenderness ratio, buckling, and compressive shaft delamination due to impact loadings traveling through shaft E have also been eliminated. This impact point shortcut and design simplification has implications for this impact strut of the current invention beyond structures due to the light weight of the impact absorber that results. This is direct axial compressive impact application communicated by a contained fluid to a conic wedge for orthogonal elastic tension momentum absorption.

FIG. 3 also shows the impact strut after its maximum translation and maximum design impact. In this case, the impact 36 on diaphragm 31 has impelled the male impactor 30 to fracture to a new bonded area D within the intact absorber shaft 34. The result of the impact 36 has split the leading portion of the absorber 34 creating a wedge-shaped multiple fracture generally beginning at conic surface 35, resulting in general fracturing of the absorber shaft 34 at the remaining damaged end 39. The prestress during fabrication of circumferential filament wound windings 37 have resulted in residual compressive force indicated by arrows 38 on the shaft of the absorber 34. This prestress force 38 within the prestress winding 37 has aided in producing a new bonding area D between the congruent surfaces 33 of the impactor 30 and the absorber 34 after axial movement that fractured and compressed the telescoping components 20 and 34.

Figure 4:
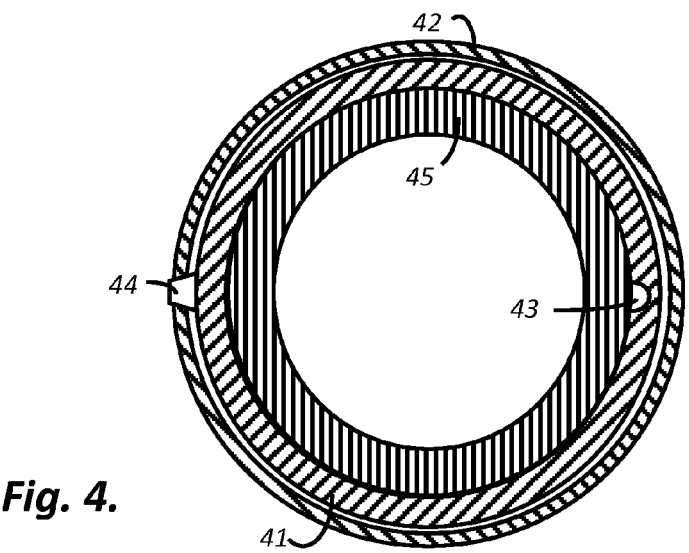
FIG. 4 is a transverse section of the impact strut taken through the circumferential elastic bands.

FIG. 4 teaches a method to predict and maximize the amount of circumferential length of the elastic bands during impact while assuring that an initial band breakage does not result in unwinding subsequent continuously wound bands. The absorber shaft 41 is surrounded by an unhindered elastic energy absorbing band 42. Note this schematic section shows a space between the absorber shaft 41 and the band 42 to indicate the freedom of movement between the two elements. Such unhindered movement can be achieved during fabrication and aided by a shaft coating such as Teflon™. In this case, the unhindered band 42 is restrained by a connection between the unhindered band 42 and the absorber shaft 41 by connection means 44. This connection means is selected to be appropriate to the material of the band 42. A polymer matrix coated fiber filament band 2 will easily be attached to the absorber shaft by adhesive. This short segmental attachment to each wrap will prevent an initial band breakage from unraveling sequential bands before their full elastic energy can be utilized. The current invention is most efficient when the maximum circumferential length of the elastic nature of the band 42 is used to retard impact. If the band is attached by attachment 41 then a symmetrical and equal stress upon attachment 41 during impact fracture of absorber shaft 41 can only be achieve by a preselected fracture location of absorber shaft 41 diametrically opposed to attachment 44. This preselected fracture is implemented by a groove or cut fabricated into absorber 41. The result of this opposition of attachment 44 and groove 43 is predictable and repeatable impact energy absorption orthogonal to the direction of impact because both the absorber shaft fracture zone and the opposing point of attachment to achieve maximum elongation is assured.

The current invention is a telescoping strut comprising an active male impactor and a female absorber. The male impactor comprises a trailing shaft, a conic bulge, and a leader shaft bonded within the female absorber. The impactor communicates impact to break the bond, displace the conic bulge axially into the absorber. The translation of conic bulge splits the female absorber and sequentially stretches a multiplicity of circumferential absorber bands. This induced circumferential strain in each sequentially band retards the impact by transformation of axial momentum into orthogonal elastic strain.

The preferred materials applied to the current invention are cured polymer matrix composites whereby the bands are at least one layer of closely spaced filament windings of elastic high-modulus fiber tow. Few high-modulus materials are applicable to absorber bands because they should possess a maximum strain in excess of three percent as the absorber bands possess continuous unhindered capacity to stretch for generally the circumference of the female absorber.

The impact stiffness capacity of the male impactor is selected to be more than the impact capacity of the structural bond to protect the impactor. To provide a measure of structural support after impact the female absorber possesses means for a secondary bond of congruent surfaces with the leader shaft after axial displacement and this secondary bond of congruent surfaces is aided by tension prestress within circumferential filament wound high-modulus fibers upon the female absorber.

The conic bulge is reinforced internally by a compressive stiffener and transverse diaphragm integral with the male impactor. This diaphragm is a useful point to for contact and impact application due to pneumatic, or hydraulic fluid.

The method of retarding impact within a bonded telescoping tubular joint comprises the following step of providing a female absorber possessing at least one layer of unfettered bands of a circumferential winding, providing a male impactor possessing a conic bulge, providing a structural bond between male impactor and female absorber, directing external impact to the male impactor for axial communication to the female absorber, whereby the impact breaks the bond and the conic bulge splits the female absorber, and progressively elastically stretches each band to retard and convert axial compressive impact momentum to orthogonal tensile strain energy for dissipation, and selecting the impact stiffness capacity of the male impactor to be greater than the impact capacity of the structural bond.

Additional steps comprise selecting the materials as cured polymer matrix composite, selecting the absorber bands possessing a maximum strain in excess of three percent, selecting the impact stiffness capacity of the male impactor to be greater than the impact capacity of the structural bond, providing the female absorber with means for a secondary bond of congruent surfaces with the leader shaft after axial displacement, providing tension prestress within circumferential filament wound high-modulus fibers upon the female absorber to add compression to the secondary bond of congruent surfaces, providing unhindered continuous capacity to stretch for generally the circumference of the female absorber to the absorber bands, selecting the bands to comprise at least one layer of closely spaced filament windings of fiber tow, providing compressive reinforcing to the conic bulge internal to the male impactor by provision of a transverse diaphragm, and directing pneumatic, or hydraulic impact to the transverse diaphragm and then to the conic bulge for communication to the female absorber.

What is claimed and worthy of a Letter Patent is:

1. A telescoping impact absorbing structural strut comprising:
   A male impactor comprising a trailing shaft, a conic bulge, and a leader shaft bonded within a female absorber,
      said male impactor communicates an impact
         to break said bonded connection,
         to displace the conic bulge axially to expand said female absorber, and
         to sequentially stretch a limited number of a multiplicity of independent circumferential absorber bands,
      thereby to retard said displacement by transformation of axial momentum into orthogonal elastic strain within said bands,
      and to rebond said connection.

2. The telescoping strut of claim 1 whereby the materials of the female absorber are cured polymer matrix composites.

3. The telescoping strut of claim 1 whereby the absorber bands possess a maximum strain in excess of three percent.

4. The telescoping strut of claim 1 whereby the impact stiffness capacity of the male impactor is selected to be more than the impact capacity of said structural bond.

5. The telescoping strut of claim 1 whereby the secondary bond of congruent surfaces is aided by tension prestress within circumferential filament wound high-modulus fibers upon the female absorber.

6. The telescoping strut of claim 1 whereby said absorber bands possess continuous unhindered capacity to stretch for generally the circumference of said female absorber.

7. The telescoping strut of claim 1 whereby said bands are at least one layer of closely spaced filament windings of elastic high-modulus fiber tow.

8. The telescoping strut of claim 1 whereby said conic bulge is reinforced internally by a compressive stiffener and transverse diaphragm integral with said male impactor.

9. The telescoping strut of claim 8 whereby a pneumatic, or hydraulic impact is communicated to said compressive stiffener and transverse diaphragm.

10. The telescoping impact absorbing strut of claim 1 whereby lesser impacts sequentially stretch fewer said bands thereby producing proportionate lesser axial displacement prior to rebond.

11. The telescoping impact absorbing strut of claim 1 whereby the strain of said circumferential bands results in triple the energy absorption per unit length compared to axial deformation.

12. A method of retarding impact within a bonded telescoping tubular joint comprising the steps of:
   providing a female absorber possessing at least one layer of a multiplicity of independent unfettered circumferential absorber bands of a circumferential winding,
   providing a male impactor possessing a leader shaft, a conic bulge, and a trailing shaft,
   providing a structural bonded connection between said leader shaft of said male impactor and a first portion of a female absorber,
   directing external impact to the male impactor for axial communication to the female absorber,
   whereby the impact breaks the bonded connection, displaces the conic bulge axially to expand the female absorber, and sequentially stretches a limited number of absorber bands,
   thereby to retard said displacement by transformation of axial momentum into orthogonal elastic strain within said bands and rebond said structural connection between said leader shaft of said male impactor and a second portion of the female absorber.

13. The method of claim 12 with the additional step of
   Selecting the materials of the female absorber as cured polymer matrix composites.

14. The method of claim 12 with the additional step of
   Selecting the absorber bands possessing a maximum strain in excess of three percent.

15. The method of claim 12 with the additional step of
   selecting the impact stiffness capacity of the male impactor to be greater than the impact capacity of said structural bond.

16. The method of claim 12 with the additional step of
   Providing tension prestress within circumferential filament wound high-modulus fibers upon the female absorber to add compression to the secondary bond of congruent surfaces.

17. The method of claim 12 with the additional step of
   Providing unhindered continuous capacity to stretch for generally the circumference of said female absorber to said absorber bands.

18. The method of claim 12 with the additional step of
   selecting said bands to comprise at least one layer of closely spaced filament windings of fiber tow.

19. The method of claim 12 with the additional step of providing compressive reinforcing to said conic bulge internal to the male impactor by provision of a transverse diaphragm.

20. The method of claim 19 with the additional step of directing pneumatic, or hydraulic impact to the transverse diaphragm and then to the conic bulge for communication to the female absorber.

\* \* \* \* \*